(12) United States Patent
Dixit et al.

(10) Patent No.: US 7,051,161 B2
(45) Date of Patent: May 23, 2006

(54) MEMORY ADMISSION CONTROL BASED ON OBJECT SIZE OR REQUEST FREQUENCY

(75) Inventors: Sudhir Dixit, Weston, MA (US); Tau Wu, Woburn, MA (US)

(73) Assignee: Nokia Corporation, Espoo (FI)

( * ) Notice: Subject to any disclaimer, the term of this patent is extended or adjusted under 35 U.S.C. 154(b) by 317 days.

(21) Appl. No.: 10/244,449

(22) Filed: Sep. 17, 2002

(65) Prior Publication Data

US 2004/0054860 A1 Mar. 18, 2004

(51) Int. Cl.
*G06F 12/00* (2006.01)

(52) U.S. Cl. ........................ 711/134; 711/133; 711/136; 711/159; 711/160

(58) Field of Classification Search ................ 711/122, 711/130, 133–134, 160–171, 216; 709/217–218, 709/223, 226
See application file for complete search history.

(56) References Cited

U.S. PATENT DOCUMENTS

| 6,012,126 | A * | 1/2000 | Aggarwal et al. | 711/133 |
|---|---|---|---|---|
| 6,266,742 | B1 * | 7/2001 | Challenger et al. | 711/133 |
| 6,272,598 | B1 * | 8/2001 | Arlitt et al. | 711/133 |
| 6,389,460 | B1 * | 5/2002 | Stewart et al. | 709/217 |
| 6,425,057 | B1 * | 7/2002 | Cherkasova et al. | 711/134 |
| 6,463,508 | B1 * | 10/2002 | Wolf et al. | 711/133 |
| 6,532,492 | B1 * | 3/2003 | Presler-Marshall | 709/223 |
| 6,760,812 | B1 * | 7/2004 | Degenaro et al. | 711/133 |
| 6,807,607 | B1 * | 10/2004 | Lamparter | 711/133 |
| 6,826,599 | B1 * | 11/2004 | Shaffer et al. | 709/213 |

OTHER PUBLICATIONS

Krishnamrthy et al., Jun. 1999, IEEE.*
Charu Aggarwal et al., "Caching on the World Wide Web," IEEE Trans. On Knowledge and Data Eng., vol. 11, No. 1, pp. 94-107 (Jan./Feb. 1999).
Lee Bresiau et al., "web Caching and Zipf-like Distributions: Evidence and Implications," IEEE Infocom, vol. XX, No. Y, pp. 1-9, (1999).

(Continued)

*Primary Examiner*—Nasser Moazzami
(74) *Attorney, Agent, or Firm*—Banner & Witcoff, Ltd.

(57) ABSTRACT

Admission of new objects into a memory such as a web cache is selectively controlled. If an object is not in the cache, but has been requested a specified number of prior occasions (e.g., if the object has been requested at least once before), it is admitted into the cache regardless of size. If the object has not previously been requested the specified number of times, the object is admitted into the cache if the object satisfies a specified size criterion (e.g., if it is smaller than the average size of objects currently stored in the cache). To make room for new objects, other objects are evicted from the cache on, e.g., a Least Recently Used (LRU) basis. The invention could be implemented on existing web caches, on distributed web caches, in client-side web caching, and in contexts unrelated to web object caching.

44 Claims, 7 Drawing Sheets

OTHER PUBLICATIONS

Pel Cao et al., "Cost-Aware WWW Proxy Caching Algorithms," USENIX Symp. On Internet Tech. And Sys, Monterey, CA pp. 1-14 (Dec. 1997).

Shudong Jin et al., "GreedyDual" Web Caching Algorithm, Proceedings of the 5th International Web Caching And Content Delivery Workshop, Lisbon, Portugal, pp. 1-10 (May 2000).

Theodore Johnson et al., "2Q: A Low Overhead High Performance Buffer Management Replacement Algorithm," Proc. Of 20th VL/DB Conference, Santiago, Chile, pp. 439-450 (1994).

Elizabeth J. O'Neil et al., "The LRU-K Page Replacement Algorithm for Database Disk Buffering," Proceedings of ACM SIGMOD '93, Washington, D.C. (May 1993) pp. 1-19.

Luigi Rizzo et al., "Replacement policies for a proxy cache," UCL-CS Research Note RN/98/13, University College, London (1998) pp. 1-22.

"ISP Caching Deployment Guide" CacheFlow Inc. Version 1.0, pp. 1-12, (Jul. 1998).

"Estimated $4.35 Billion in Ecommerce sales at Risk Each Year" (Jun. 30, 1999) obtained from http://www.intelliquest.com/press/archive/release85.asp.

A. Silberschatz and P.B. Galvin, *Operating Systems Concepts, Fifth Edition*. (Addison-Wesley, 1998), pp. 302-313.

* cited by examiner

MEMORY ADMISSION CONTROL BASED ON OBJECT SIZE OR REQUEST FREQUENCY

FIELD OF THE INVENTION

This invention relates to selective admission of data into memory. In particular, this invention relates to systems and methods for selectively admitting objects into, e.g., a web cache.

BACKGROUND OF THE INVENTION

The Internet, and in particular, the World Wide Web (WWW or web), is becoming an integral part of modern life. Unfortunately, the growth of the web places ever-increasing demands on the network backbone and other facilities that form the web. Web traffic has been growing at a much faster pace than available bandwidth, often causing substantial latency between user request for content and user receipt of that content. In many cases, this latency results from network congestion caused by numerous requests for transmission of the same content. Such activities can overload (and in some cases, disable) web servers and other network facilities. At a minimum, multiple requests for the same material from a web server increase delays experienced by web users.

Web caching offers potential relief to overloaded networks. As is known in the art, web caching is a technique of storing popular web content at, and providing that stored content to end users from, locations in addition to the web servers that initially provide that content. By making copies of web pages and other content available from alternate locations, the load upon the origin servers that initially provide the content is reduced, substantially reducing latency. Web caching also helps transfer load from the Internet backbone to smaller networks. By storing frequently requested web content at one or more web cache servers located at network edge(s), future local requests for that content can be served from the web cache(s) instead of repeatedly obtaining content from the origin servers. This reduces Internet traffic, and may also reduce load upon Wide Area Networks (WANs) and other networks that are linked by (or to) the Internet. Load on origin web servers is reduced because those origin servers service fewer requests.

Web caches may be deployed in numerous and varied configurations. FIGS. 1 and 2 represent only a few examples. Both FIG. 1 and FIG. 2 illustrate deployment scenarios in which the existence of the web server is not apparent to the end user/client. It is possible that no manual or automatic configuration of client web browser software is needed to access the web cache (although the web cache may only serve users within a specific network), and the user may perceive no difference between content requests served by a web cache vs. content requests served by an origin server. FIG. 1 illustrates a typical web cache deployed at a network edge. In this scenario, clients on a local network send HTTP (Hypertext Transfer Protocol) requests to origin servers on the Internet. These requests may be forwarded by a local network router within the local network to a switch. That switch may have Layer 4 (transport layer) or Layer 7 (application layer) capability, and thus be able to identify HTTP traffic.

For example, a Layer 4 switch might identify HTTP traffic by checking the TCP (Transmission Control Protocol) port number of incoming IP (Internet Protocol) packets. If the destination port number is 80 (default HTTP server port number), the packet is forwarded to the cache. Otherwise, the packet could be forwarded to the WAN Router. The cache then intercepts the TCP connection from the client and obtains the URL (Universal Resource Locator) for the desired Web pages or other content. A Layer 7 switch (also known as a content switch or web switch) may replace the Layer 4 switch to provide additional functionality. For example, TCP connections from clients may be intercepted by a Layer 7 switch instead of the cache, and the Layer 7 switch might make routing decisions based on the URL. In either event, a switch identifies HTTP traffic and forwards that traffic to the cache. If the content requested by the client is stored in the cache, that content is provided to the client from the cache. Otherwise, the cache fetches the content from an origin server or other location, and serves the content to the requesting client.

FIG. 2 illustrates a typical reverse proxy scenario where web caches are used to relieve the load upon web servers. Incoming requests are intercepted by a Layer 7 switch. Based on how the reverse proxy is configured, either a cache or server is selected to serve the request. For example, frequently changing content may generally be served by a web server, and relatively unchanging content served by a web cache. Because the cost of a web cache is typically much lower than the cost of a web server, deploying web caches to serve popular static content provides an economic and scalable server farm solution.

In both scenarios shown by FIGS. 1 and 2, as well as in other scenarios, web caching improves user experience and relieves load on origin servers. If deployed at a network edge, web caching can also provide substantial cost savings in terms of backbone bandwidth. Other aspects of web caching may undercut these benefits, however. In a steady state, a web cache optimally operates at full (or near-full) storage capacity. Accordingly, before a new object may be stored in the cache, one or more old objects must be evicted from the cache. Various cache replacement policies have been developed to optimize the eviction process based on measurements such as maximizing Hit Ratio (ratio of requests served by cache to all requests received by cache) or minimizing user perceived latency.

However, web caching has unique characteristics that must be addressed. Unlike caching in a memory hierarchy using fixed-size blocks, web caching must accommodate web objects of widely varying size. Moreover, an overloaded or improperly configured web cache may itself become a network bottleneck and increase latency rather than decrease latency. Typically, web caches store actual content in hard disk drives or in other storage devices that have relatively slow moving mechanical parts. These devices support a relatively limited number of operations per second; these operations include storing new objects as well as accessing stored objects. In other words, time spent storing new objects is generally at the expense of time that might be used to access previously stored objects. Unless the number of disk (or other device) I/O operations are controlled in some manner, the throughput of the cache is not optimized.

To date, there have been limited solutions to these problems. As one example, a Layer 7 switch can be deployed as in FIG. 1, and configured to bypass the cache when the cache becomes overloaded. This approach increases traffic on the network backbone and does not address the underlying cause of cache overload. Multiple hard drives (or even multiple caches) can be deployed in parallel so as to improve total cache throughput, but this solution requires increased hardware investment.

Accordingly, there remains a need for improved methods and systems of managing web cache storage.

SUMMARY OF THE INVENTION

The present invention improves operation of a memory device, such as a web cache, by selectively controlling admission of new objects. If an object is not stored in the memory device, but has previously been requested a designated number of times, it is stored regardless of size. If a not-yet-stored object has not previously been requested from the memory, the object is stored in the memory if the object meets a certain size criterion. In one embodiment, the object is admitted upon a second request regardless of its size, and is admitted on a first request if it is smaller than the average size of objects currently stored in the memory. To make room for new objects, other objects are evicted from the memory on, e.g., a Least Recently Used (LRU) basis. The invention could be implemented on existing web caches, on distributed web caches, and in client-side web caching. The invention could further be implemented in connection with storing data that may be unrelated to Internet content.

DETAILED DESCRIPTION OF THE INVENTION

Figure 1:
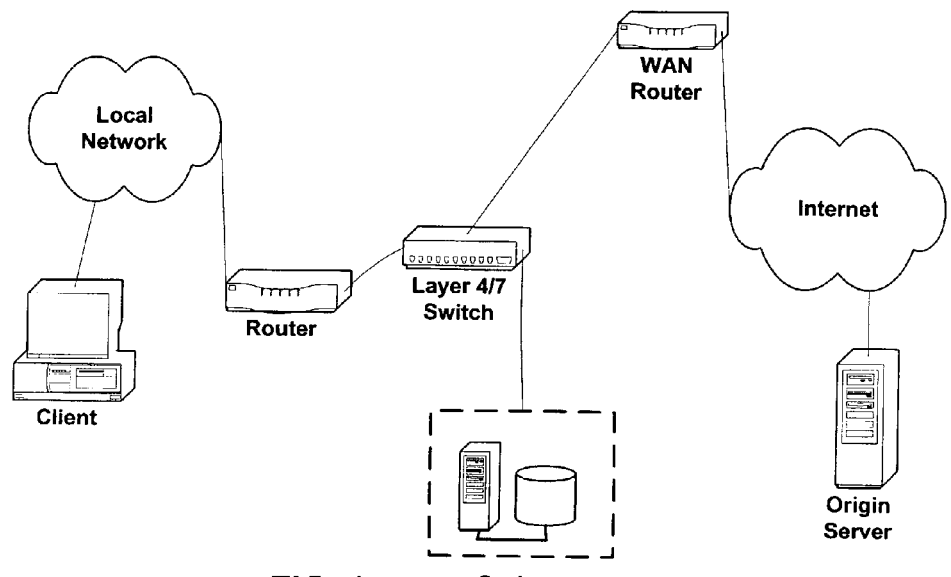
FIG. 1 is an example of a web cache deployed within a network.

The present invention implements admission control to selectively admit data into a memory. As used herein, and unless otherwise specified, "memory" includes both non-volatile data storage (e.g., hard disk drives, optical drives, etc.) and volatile memory (e.g., RAM). The invention may advantageously be implemented in a web cache, and will be described using a web cache as an example. The invention is not limited to such implementation, however. The invention may be used to improve memory management in client side caching, or in general data caching that may be unrelated to Internet content. In that vein, use of the word "caching" in this description to indicate storage of an object in a web cache should not be construed as limiting the invention to data storage environments previously referred to as caches.

One metric often used to evaluate performance of web caches is the Hit Ratio:

$$\text{Hit Ratio} = \frac{\text{requests successfully served}}{\text{total requests}}$$

Caching memory systems in contexts other than web caching often achieve Hit Ratios exceeding 95%. In network edge web cache deployment scenarios, however, approximately half of all requests appear only once. By implication, a web cache Hit Ratio generally will not exceed 50% to 60% under the best of conditions. Evicting an object from a web cache to accommodate a new object is thus more likely to exceed the benefit of bringing the new object into the web cache. Moreover, in the case of a web cache using a hard disk drive or other storage device having moving mechanical parts, bringing a new object (which may be in the half of objects not requested more than once) into the web cache may require time-consuming operations (e.g., movement of a read/write arm).

Another measurement of web cache efficiency is throughput, or the amount of content served by the web cache over time. For a web cache using a hard disk drive or other storage device having moving mechanical parts, throughput can be improved by reducing the total number of input/output (I/O) operations on the disk or other device; time spent writing new objects into a web cache detracts from time available to serve requests with objects already stored in the web cache. Without admission control, simply improving Hit Ratio does not enhance throughput in such systems. This is shown by observing that without admission control, a web cache responds to each incoming request by either serving a cached object (e.g., a disk read operation) or caching a new object upon retrieval from another server (e.g., a disk write operation). Because there are only two possibilities for each request of a web cache without admission control, the following equation generally governs:

$$H+I=1,$$

where H is the Hit Ratio, and I is the statistical number of insertion operations per request. For example, if Hit Ratio is 45% (45 out of every 100 requests are served from the cache), I is 55% (55 requests out of every 100 cause a new object to be written into the cache). Other operations, such as evicting an object from the cache, are typically performed in main memory (e.g., RAM) and do not require a disk operation.

If admission control is implemented, the total number of I/O operations for a disk or other device can be reduced. If the requested object is in the cache, a read operation occurs when the object is served. If the requested object is not in the cache, however, it is not necessarily cached upon retrieval from another web server. If the cache storage spends less time writing objects into the cache, more time is available to serve requests. By appropriately controlling admission of new objects into the cache, both Hit Ratio and throughput may thus be improved.

In the context of web caches, object size is generally unrelated to the frequency with which the object is requested. If an object is not in a web cache and has not previously been requested from the web cache, an embodiment of the present invention admits the new object only if its size is smaller than the average size of currently cached objects. This reduces the number of evictions per new admitted object, as the new object is statistically smaller than the object(s) being evicted. This also improves Hit Ratio. Statistically, more objects can be cached by reducing average object sizes. If an object fails the admission control test on the first request, the object is then admitted upon a subsequent request. This allows the web cache to store large but popular objects. A candidate list may be maintained by the web cache to store the URLs of each first time request. Because only the URLs are stored, and not the actual objects, the candidate list can reside in a web cache server's main memory (e.g. volatile RAM); no disk I/O operation is necessary to add or remove candidate objects from the list.

Figure 3:
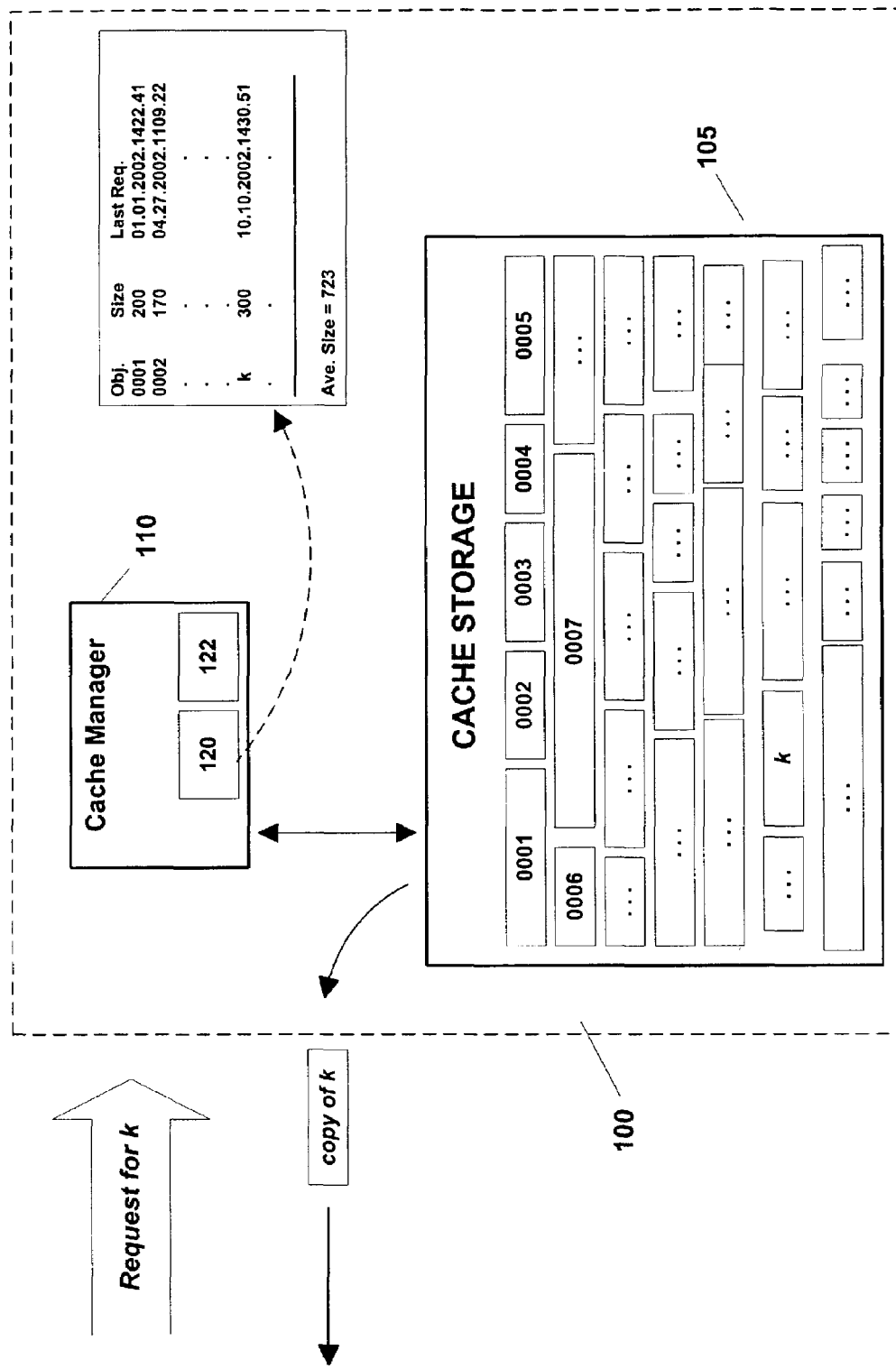
FIG. 3 is a schematic drawing of a web cache servicing a request for an object.
Figure 4:
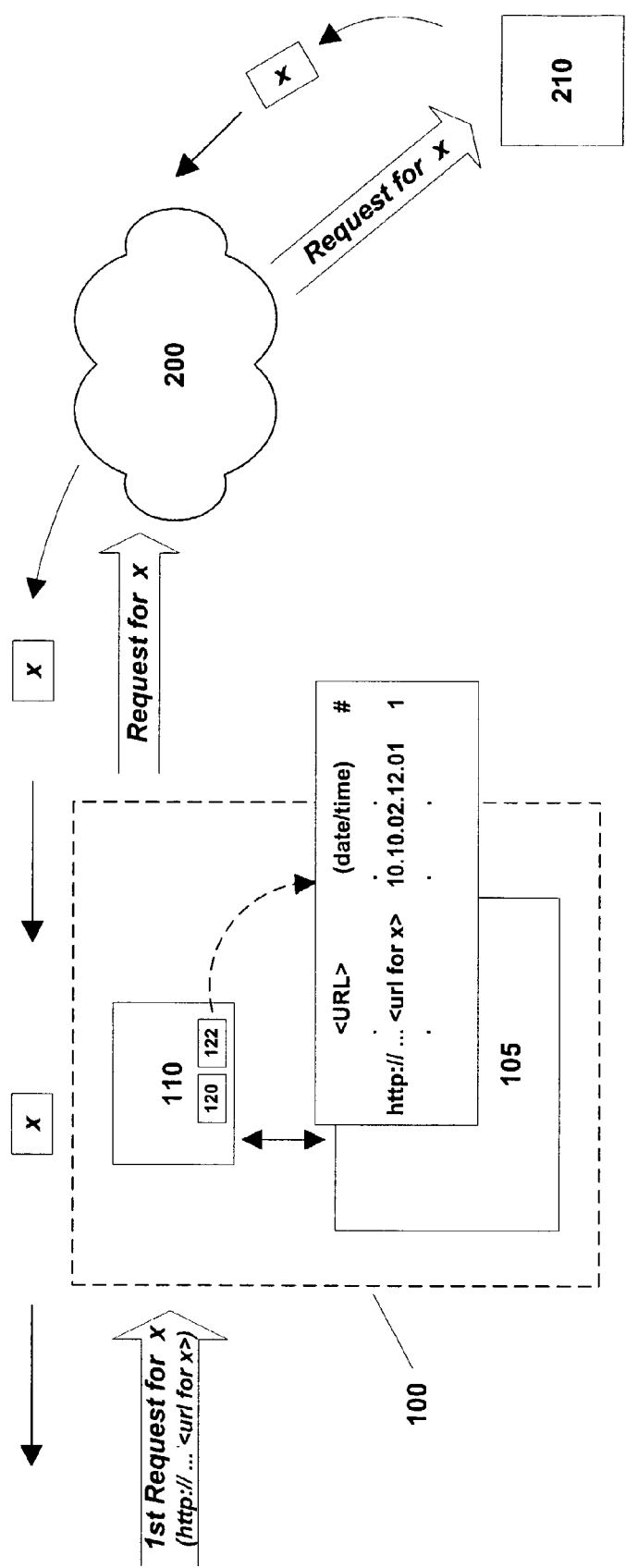
FIG. 4 is another schematic drawing of a web cache servicing a request for an object.
Figure 5:
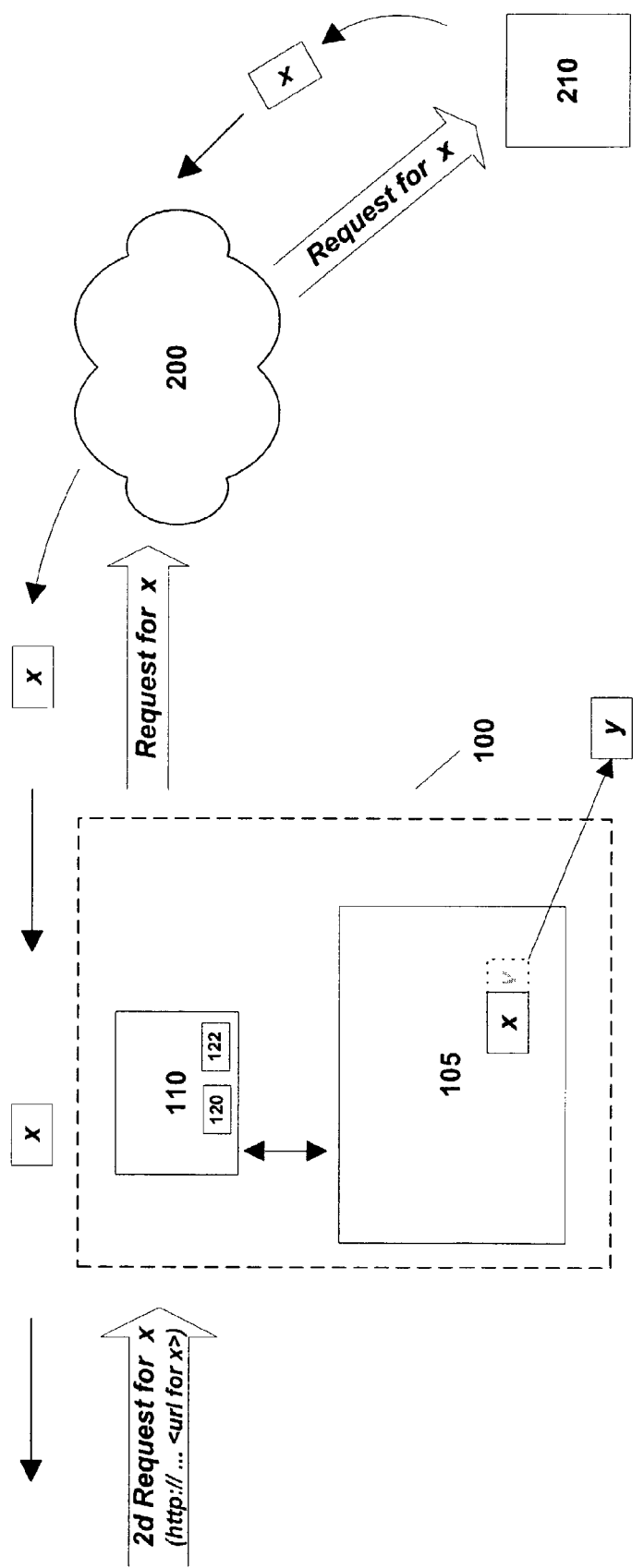
FIG. 5 is a schematic drawing of an object being admitted into a web cache.

FIGS. 3 through 5 schematically show operation of one embodiment of the invention. FIG. 3 shows web cache 100, which includes cache storage 105 and cache manager 110. Cache storage 105 can be a hard disk drive (or multiple hard disk drives) or some other device for storage of large amounts of data, but the invention could be implemented using any type of memory. Stored upon cache storage 105 are multiple objects 0001, 0002, 0003, etc. These objects may include text files, graphics files, video or audio files, applets, or any other type of data (or software or software/data combination) that might be requested over the Internet or other network. Cache manager 110 includes software that controls operation of web cache 100, and that may reside on (and control the operation of) a web cache. Cache manager 110 could alternately reside on (and control operation of) other computing devices having the necessary processor(s) and memory.

Figure 2:
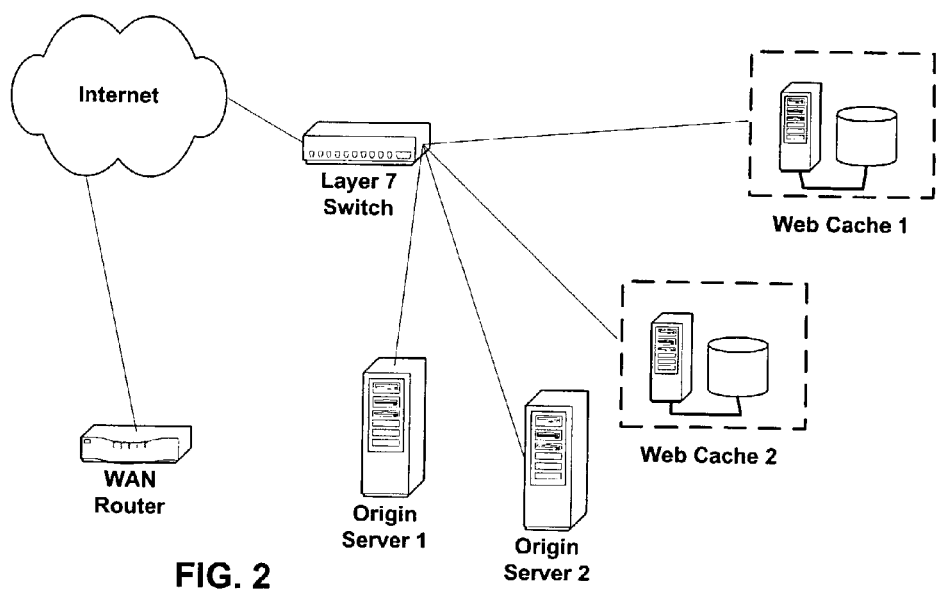
FIG. 2 is another example of a web cache deployed within a network.

Through appropriate network interconnection(s), such as but not limited to those shown in FIGS. 1 and 2, cache manager 110 receives incoming requests for web objects. Cache manager 110 also controls retrieval of objects stored in cache storage 105, as well as writing new objects into storage 105. Cache manager 110 further maintains one or more data files to track objects stored in cache storage 105, as well as to track requests for objects. Those data files are shown schematically in FIGS. 3–5 as files 120 and 122. Two such files are shown for purposes of illustrating the operation of the invention. However, persons skilled in the art will appreciate that the types of information contained in those data files (explained below) need not be in a specific arrangement. In other words, the information could be stored in only one file or in more than two files. In one embodiment, files 120 and 122 may be maintained in the main memory (RAM) of a web cache, and thus accessible without requiring an I/O operation of cache storage 105 or of some other storage device having moving mechanical components.

As shown in FIG. 3, cache 100 receives a request for object k. Cache manager 110 then determines from file 120 that object k is stored in cache storage 105. A copy of object k is then retrieved from cache storage 105 and served in response to the request. File 120 includes various data about the objects in cache storage 105, such as the size of each object and the date and time when the object was last requested. Cache manager 110 also calculates an average size of the objects in cache storage 105. Upon serving a copy of object k in response to the request, cache manager 110 updates file 120 with the date and/or time of the request.

FIG. 4 illustrates a request for an object x that is not currently stored within cache storage 105. After determining that object x is not identified in file 120, web cache 100 retrieves object x from origin server 210. Object x is retrieved via one or more networks and/or the Internet, represented collectively as cloud 200. Upon obtaining object x, web cache 100 serves object x in response to the request. Cache manager 110 also determines whether object x should be stored in cache storage 105. Cache manager 110 first determines from file 122 whether object x has previously been requested. Because object x has not previously been requested, it is not stored in cache storage 105 at that point. Cache manager 110 then determines from file 120 (see FIG. 3) whether the size of object x is less than the average size of objects already stored in cache storage 105. Because the size of object x is not less than the average, cache manager 110 still does not store object x in cache storage 105. However, as shown in FIG. 4, file 122 is updated to indicate the time and/or date of the current request, and optionally, the number of prior requests. Persons skilled in the art will appreciate that these determinations need not occur in the described order. For example, cache manager 110 might first compare object x to a size criterion, and upon determining that it does not satisfy the criterion, determine if the object has previously been requested.

FIG. 5 illustrates a subsequent request for object x. Upon receiving the subsequent request, web cache 100 again retrieves object x from origin server 210, and serves object x in response to the request. Cache manager 110 then determines from file 122 that object x has previously been requested. Cache manager 110 then evicts object y from cache storage 105 to make room for object x. In one embodiment, eviction may occur by simple identification of the currently stored object(s) (from file 120) for which the currently occupied space in cache storage 105 will be made available for storing object x, and that may be wholly or partially overwritten by object x when it is stored in cache storage 105. In other words, a separate overwriting step to first erase object y is not required before object x is stored in cache storage 105. Once object y is evicted, object x is stored. File 120 is also updated to reflect eviction of object y, storage of object x, and any change in average object size. In the described embodiment, object y is evicted based on a Least Recently Used (LRU) basis; the date and/or time of the last request for object y may be determined from file 120. However, other eviction algorithms could be used. Moreover, it may not be necessary to evict objects if the cache has room to store object x.

Figure 6:
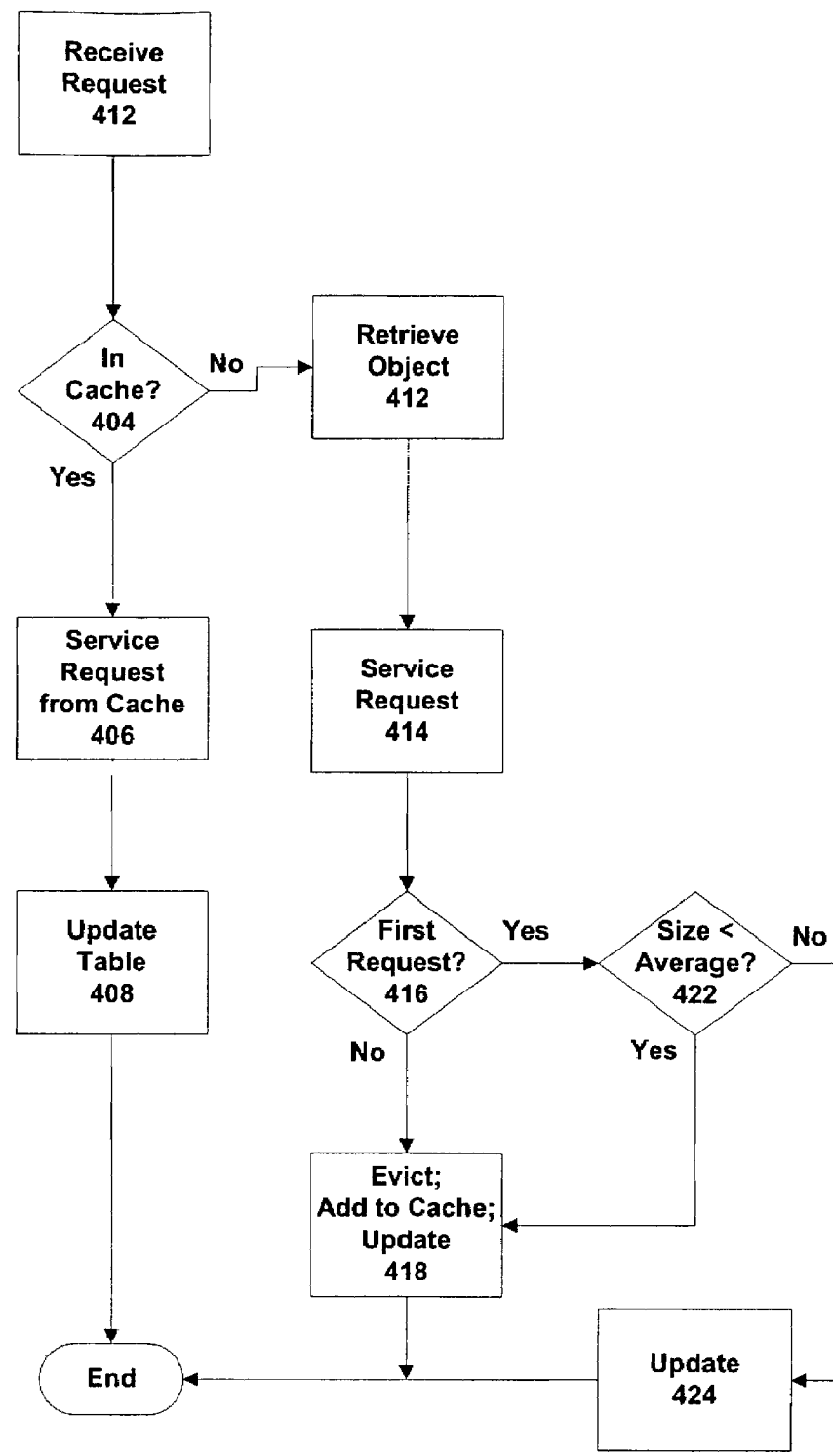
FIG. 6 is a flow chart showing one example of a method according to the invention.

FIG. 6 is a flow chart showing operation of an embodiment of the invention. Beginning at step 412, the web cache receives a request for an object. At step 404, a determination is made as to whether the object is currently cached. If so, the request is serviced from the cache at step 406, the appropriate data records updated (e.g., date/time of request) at step 408, and the process ends. If it is determined at step 404 that the requested object is not cached, the object is retrieved at step 412, and the request serviced at step 414 (i.e., the object is served in response to the request). At step 416, a determination is made as to whether the object has previously been requested. If it is not the first request, flow proceeds to step 418. At step 418, one or more objects are evicted from the cache if necessary to make room for the new object, the new object is stored, and the appropriate data records updated. After step 418, flow proceeds to the end. If this is the first request for the object, flow would branch at step 416 to step 422. At step 422, a determination is made as to whether the size of the retrieved object is less than the average size of currently cached objects. If yes, the retrieved object will be cached, and flow proceeds to step 418. If the retrieved object is larger than the average size of currently cached objects, the appropriate data records are updated at step 424 (e.g., date and/or time of request), but the retrieved object is not cached, and flow proceeds to end.

Figure 7:
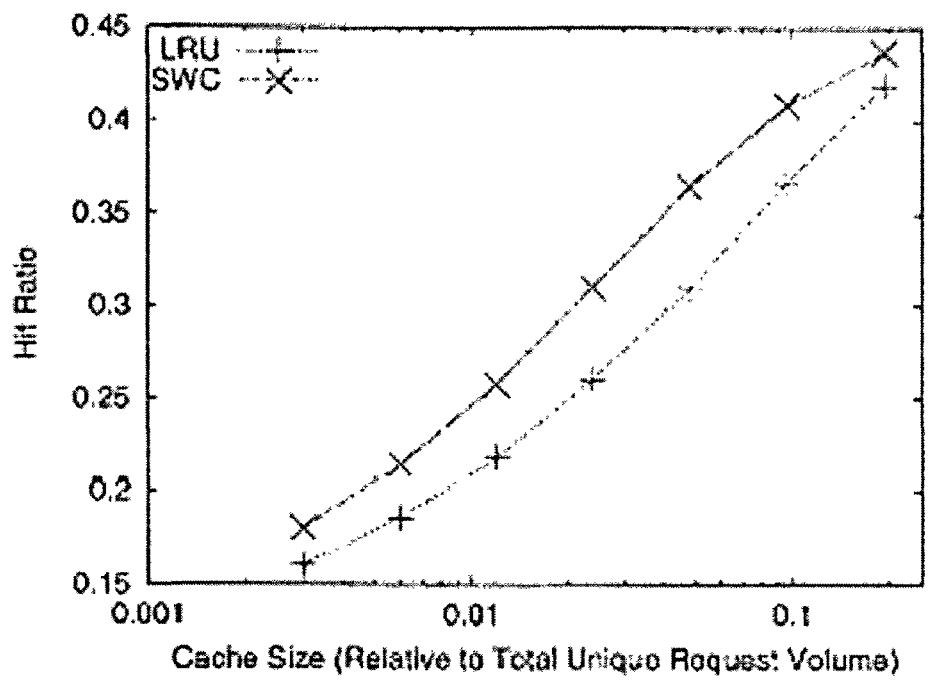
FIG. 7 is a graph showing a comparison of Hit Ratio for the invention compared to web cache management using only LRU eviction.

Selective web caching according to the present invention was tested in a simulation using web access traces collected from a major Internet node, and which contained more than 13 million cacheable requests during an eighteen day period. In the simulation, cache size was varied from 0.17% to approximately 11% of total traffic volumes. Hit Ratio for selective web caching (SWC) according to the invention was compared to Hit Ratio for web caching using only LRU eviction (LRU-only caching). Also compared was the number of insertion and eviction operations per request for SWC versus LRU-only caching. FIG. 7 depicts Hit Ratios, at different cache sizes, of SWC and of LRU-only caching. As shown in FIG. 7, SWC consistently achieved Hit Ratios throughout the range of simulated cache sizes that were higher than the Hit Ratios for LRU-only caching. SWC improvement to Hit Ratio ranged from 1.8% to 5.5%.

Figure 8:
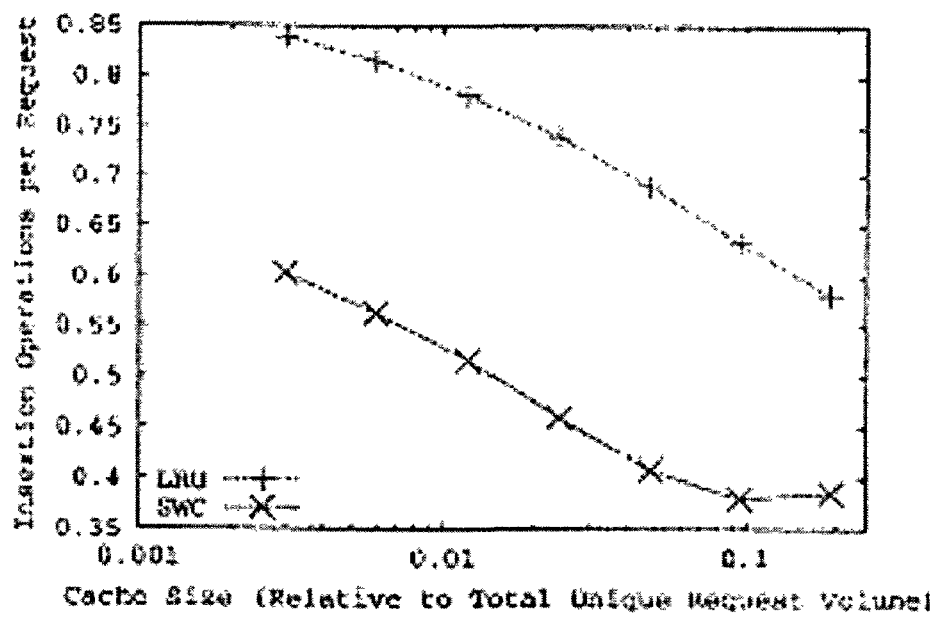
FIG. 8 is a graph showing a comparison of insertion operations per request for the invention compared to web cache management using only LRU eviction.
Figure 9:
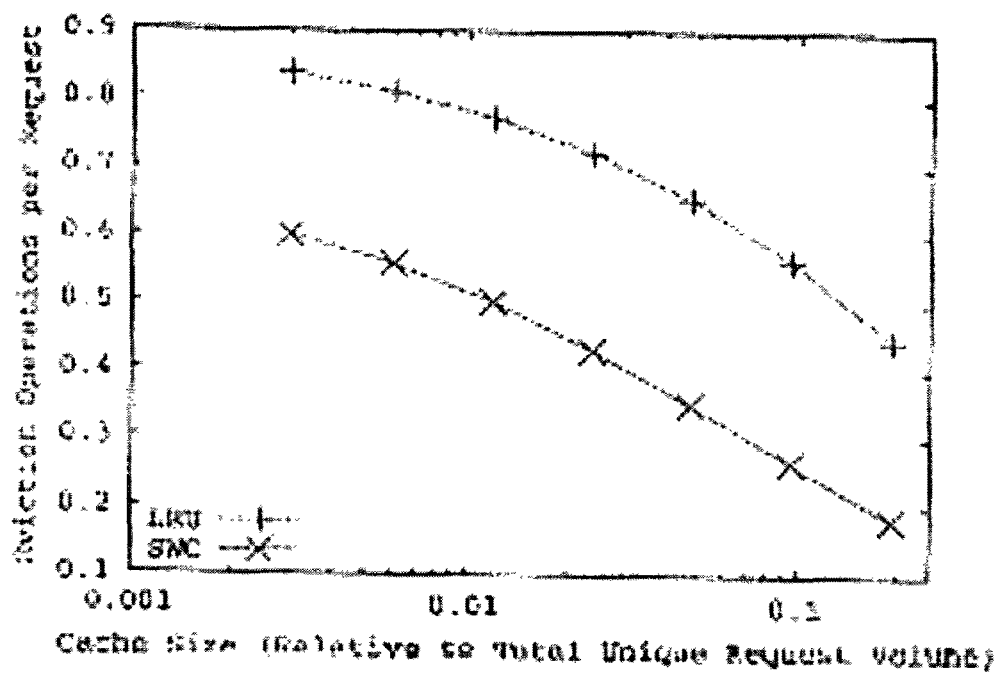
FIG. 9 is a graph showing a comparison of eviction operations per request for the invention compared to web cache management using only LRU eviction.

FIGS. 8 and 9 illustrate the average number of insertion and eviction operations per request for SWC and LRU-only caching. SWC shows significantly lower insertion/eviction operations across the entire simulated cache size range. Notably, SWC reduced insertion operations by 30% to 40%, making higher cache throughput possible.

Figure 10:
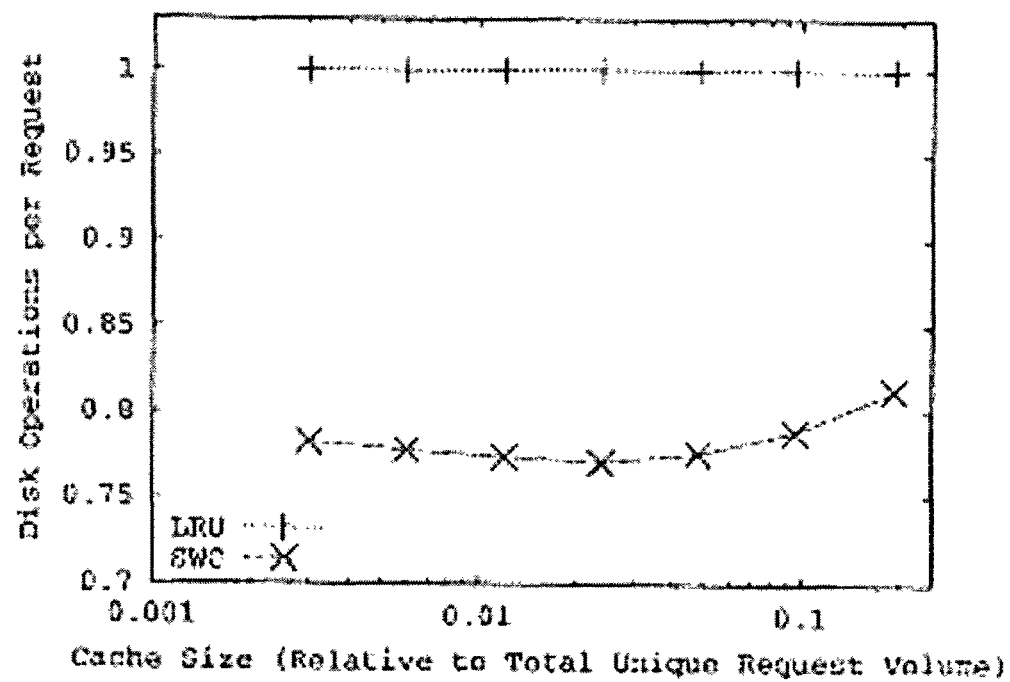
FIG. 10 is a graph showing a comparison of disk operations per request for the invention compared to web cache management using only LRU eviction.

FIG. 10 illustrates the total number of disk operations at different cache sizes for SWC and LRU-only caching. Compared to one operation per request for LRU-only caching (see above), SWC operations per request range from 0.77 to 0.81. Notably, this is achieved in conjunction with consistently higher Hit Ratios.

Although specific examples of carrying out the invention have been described, those skilled in the art will appreciate that there are numerous variations and permutations of the above described systems and methods that fall within the spirit and scope of the invention as set forth in the appended claims. For example, a machine-readable medium could have machine-executable instructions stored thereon such that, when the instructions are read and executed by an appropriate device (or devices), steps of a method according to the invention are performed. As another example, eviction schemes other than LRU could be employed instead of, or in conjunction with, LRU eviction. As yet another example, various parameters in the above described methods and systems could varied. Instead of caching an object on a second request, the object could be cached on the third or other subsequent request. Instead of caching an object if its size is less than the average of the currently cached objects, the object might be cached if its size is less than a median cached object size, a percentage or other multiple of the average cached object size, or using some other size criterion. The invention might be implemented in environments other than web caches. The invention might also be implemented in environments where a request for an object is generated internally, either in response to receipt of an externally-generated request, or independent of an external request. These and other modifications are within the scope of the invention as defined by the attached claims.

We claim:

1. A method of managing a computer memory by selectively admitting new objects into the memory, comprising:
    receiving requests for objects not stored in the memory;
    determining, as to each of the requested objects, whether the requested object has previously been requested a designated number of times, wherein the designated number is fixed;
    as to each of the requested objects determined to have previously been requested the designated number of times, storing the requested object in the memory based upon that determination;
    receiving requests for additional objects not stored in the memory, wherein at least some of the additional requested objects have not previously been requested the designated number of times;
    determining, as to each of the additional requested objects, whether the additional requested object satisfies a size criterion;
    as to each of the additional requested objects satisfying the size criterion, storing the additional requested object in the memory based upon the additional requested object satisfying the size criterion and without regard to whether the additional requested object has previously been requested the designated number of times; and
    evicting one or more previously-stored objects in connection with storing one of the additional requested objects that satisfies the size criterion and that has not previously been requested.

2. The method of claim 1, further comprising:
    determining, as to each of the additional requested objects, and prior to determining whether the additional requested object satisfies the size criterion, that the additional requested object has not previously been requested designated number of times.

3. The method of claim 1, further comprising:
    updating data records of a first type to indicate that the requested objects and additional requested objects have been requested.

4. The method of claim 3, further comprising:
    updating a second type of data record upon storage in the memory of one of the requested objects or one of the additional requested objects and recalculating the size criterion based upon said storage.

5. The method of claim 1, wherein the evicted one or more previously-stored objects are evicted on a Least Recently Used (LRU) basis.

6. The method of claim 1, wherein receiving requests for objects and receiving requests for additional objects comprise receiving requests for objects having Universal Resource Locators (URLs).

7. The method of claim 6, wherein receiving requests for objects having URLs comprises receiving requests for web content available from an origin web server.

8. The method of claim 6, further comprising:
    determining, as to each of the additional requested objects, and prior to determining whether the additional requested object satisfies the size criterion, that the additional requested object has not previously been requested the designated number of times.

9. The method of claim 6, further comprising:
    updating data records of a first type to indicate that the requested objects and the additional requested objects have been requested;
    updating a second type of data record upon storage in the memory of one of the requested objects or one of the additional requested objects and recalculating the size criterion based upon said storage.

10. The method of claim 6, wherein the evicted one or more previously-stored objects are evicted on a Least Recently Used (LRU) basis.

11. A method of managing a computer memory by selectively admitting new objects into the memory, comprising:

receiving a request for an object not stored in the memory;
storing the object in the memory if it has previously been requested a designated number of times;
storing the object in the memory if its size satisfies a size criterion; and
evicting, as may be necessary in connection with storing a not-previously-requested object having a size satisfying the size criterion, one or more currently stored objects, wherein:
  storing the object in the memory if it has previously been requested comprises storing the object in memory if the object has been requested one prior time, and
  storing the object in memory if its size satisfies the size criterion comprises storing the object in memory if it is smaller than the average size of objects currently stored.

12. The method of claim 11, wherein the step of storing the object in the memory if it has previously been requested comprises storing the object in the memory based on the object having been requested the designated number of times.

13. A method of managing a computer memory by selectively admitting new objects into the memory, comprising:
receiving a request for an object not stored in the memory;
storing the object in the memory if it has previously been requested a designated number of times;
storing the object in the memory if its size satisfies a size criterion; and
evicting, as may be necessary in connection with storing a not-previously-requested object having a size satisfying the size criterion, one or more currently stored objects, wherein:
  receiving a request for an object comprises receiving a request for an object having a Universal Resource Locator (URL),
  storing the object in the memory if it has previously been requested comprises storing the object in memory if the object has been requested one prior time, and
  storing the object in memory if its size satisfies the size criterion comprises storing the object in memory if it is smaller than the average size of objects currently stored.

14. The method of claim 13, wherein the step of storing the object in the memory if it has previously been requested comprises storing the object in the memory based on the object having been requested the designated number of times.

15. A server, comprising:
at least one network connection permitting communication with client devices and with origin servers providing objects;
a memory; and
a processor configured to control admission of objects into the memory by
  receiving requests for objects not stored in the memory and retrieving the requested objects from one or more of the origin servers,
  determining, as to each of the requested objects, whether the requested object has previously been requested a designated number of times, wherein the designated number is fixed,
  as to each of the requested objects determined to have previously been requested the designated number of times, storing the requested object in the memory based upon that determination,
  receiving requests for additional objects not stored in the memory, wherein at least some of the additional requested objects have not previously been requested the designated number of times, and retrieving the additional requested objects from one or more of the origin servers,
  determining, as to each of the additional requested objects, whether the additional requested object satisfies a size criterion,
  as to each of the additional requested objects satisfying the size criterion, storing the additional requested object in the memory based upon the additional requested object satisfying the size criterion and without regard to whether the additional requested object has previously been requested the designated number of times, and
  evicting one or more previously-stored objects, in connection with storing one of the additional requested objects that satisfies the size criterion and that has not previously been requested.

16. The server of claim 15, wherein the processor is configured to
determine, as to each of the additional requested objects, and prior to determining whether the additional requested object satisfies the size criterion, that the additional requested object has not previously been requested the designated number of times.

17. The server of claim 15, wherein the processor is further configured to update data records of a first type to indicate that the requested objects and additional requested objects have been requested.

18. The server of claim 17, wherein the processor is further configured to update a second type of data record upon storage in the memory of one of the requested objects or one of the additional requested objects and to recalculate the size criterion based upon said storage.

19. The server of claim 15, wherein the processor is configured to evict one or more previously-stored objects on a Least Recently Used (LRU) basis.

20. The server of claim 15, wherein the server is a web server, wherein receiving requests for objects and receiving requests for additional objects comprise receiving requests for objects having Universal Resource Locators (URLs), and wherein the processor is configured retrieve the requested objects and additional requested objects from one or more of the origin servers based on their URLs.

21. The server of claim 20, wherein the requested objects and additional requested objects comprise web content.

22. The server of claim 20, wherein the processor is configured to
determine, as to each of the additional requested objects, and prior to determining whether the additional requested object satisfies the size criterion, that the additional requested object has not previously been requested the designated number of times.

23. The server of claim 20, wherein the processor is further configured to:
update data records of a first type to indicate that the requested objects and the additional requested objects have been requested, and
update a second type of data record upon storage in the memory of one of the requested objects or one of the additional requested objects and to recalculate the size criterion based upon said storage.

24. The server of claim 20, wherein the processor is configured to evict one or more previously-stored objects on a Least Recently Used (LRU) basis.

25. A server, comprising:
- at least one network connection permitting communication with client devices and with one or more origin servers providing objects;
- a memory; and
- a processor configured to control admission of objects into the memory by
  - receiving a request for an object not stored in the memory and retrieving the object from an origin server,
  - storing the object in the memory if it has previously been requested one prior time,
  - storing the object in the memory if its size is smaller than the average size of objects currently stored, and
  - evicting, as may be necessary in connection with storing a not-previously-requested object having a size that satisfies the size criterion, one or more currently stored objects.

26. The server of claim 25, wherein the server is a web server, wherein the requested object has a Universal Resource Locator (URL), and wherein the processor is configured to retrieve the object from an origin server based on the URL.

27. The server of claim 25, wherein the step of storing the object in the memory if it has previously been requested comprises storing the object in the memory based on the object having been requested the designated number of times.

28. The server of claim 26, wherein the step of storing the object in the memory if it has previously been requested comprises storing the object in the memory based on the object having been requested the designated number of times.

29. A machine-readable medium having machine-executable instructions for performing steps comprising:
- receiving requests for objects not stored in a memory;
- determining, as to each of the requested objects, whether the requested object has previously been requested a designated number of times, wherein the designated number is fixed;
- as to each of the requested objects determined to have previously been requested the designated number of times, storing the requested object in the memory based upon that determination;
- receiving requests for additional objects not stored in the memory, wherein at least some of the additional requested objects have not previously been requested the designated number of times;
- determining, as to each of the additional requested objects, whether the additional requested object satisfies a size criterion;
- as to each of the additional requested objects satisfying the size criterion, storing the additional requested object in the memory based upon the additional requested object satisfying the size criterion and without regard to whether the additional requested object has previously been requested the designated number of times; and
- evicting one or more previously-stored objects, in connection with storing one of the additional requested objects that satisfies the size criterion and that has not previously been requested.

30. The machine-readable medium of claim 29, comprising further machine-executable instructions for performing the steps of:
- determining, as to each of the additional requested objects, and prior to determining whether the additional requested object satisfies the size criterion, that the additional requested object has not previously been requested the designated number of times.

31. The machine-readable medium of claim 29, comprising further machine-executable instructions for performing the step of:
- updating data records of a first type to indicate that the requested objects and additional requested objects have been requested.

32. The machine-readable medium of claim 31, comprising further machine-executable instructions for performing the steps of:
- updating a second type of data record upon storage in the memory of one of the requested objects or one of the additional requested objects and recalculating the size criterion based upon said storage.

33. The machine-readable medium of claim 29, wherein the evicted one or more previously-stored objects are evicted on a Least Recently Used (LRU) basis.

34. The machine-readable medium of claim 29, wherein receiving requests for objects and receiving requests for additional objects comprise receiving requests for objects having Universal Resource Locators (URLs).

35. The machine-readable medium of claim 34, wherein receiving requests for objects having URLs comprises receiving requests for web content available from an origin web server.

36. The machine-readable medium of claim 34, comprising further machine-executable instructions for performing the steps of:
- determining, as to each of the additional requested objects, and prior to determining whether the additional requested object satisfies the size criterion, that the additional requested object has not previously been requested the designated number of times.

37. The machine-readable medium of claim 34, comprising further machine-executable instructions for performing the steps of:
- updating data records of a first type to indicate that the requested objects and the additional requested objects have been requested;
- updating a second type of data record upon storage in the memory of one of the requested objects or one of the additional requested objects and recalculating the size criterion based upon said storage.

38. The machine-readable medium of claim 34, wherein the evicted one or more previously-stored objects are evicted on a Least Recently Used (LRU) basis.

39. A machine-readable medium having machine-executable instructions for performing steps comprising:
- receiving a request for an object not stored in a memory;
- storing the object in the memory if it has previously been requested a designated number of times;
- storing the object in the memory if its size satisfies a size criterion; and
- evicting, as may be necessary in connection with storing a not-previously-requested object having a size satisfying the size criterion, one or more currently stored objects, wherein
  - storing the object in the memory if it has previously been requested comprises storing the object in memory if the object has been requested one prior time, and
  - storing the object in memory if its size satisfies the size criterion comprises storing the object in memory if it is smaller than the average size of objects currently stored.

40. The machine-readable medium of claim 39, wherein the step of storing the object in the memory if it has previously been requested comprises storing the object in the memory based on the object having been requested the designated number of times.

41. A machine-readable medium having machine-executable instructions for performing steps comprising:
  receiving a request for an object not stored in a memory;
  storing the object in the memory if it has previously been requested a designated number of times;
  storing the object in the memory if its size satisfies a size criterion; and
  evicting, as may be necessary in connection with storing a not-previously-requested object having a size satisfying the size criterion, one or more currently stored objects, wherein
    receiving a request for an object comprises receiving a request for an object having a Universal Resource Locator (URL),
    storing the object in the memory if it has previously been requested comprises storing the object in memory if the object has been requested one prior time, and
    storing the object in memory if its size satisfies the size criterion comprises storing the object in memory if it is smaller than the average size of objects currently stored.

42. The machine-readable medium of claim 41, wherein the step of storing the object in the memory if it has previously been requested comprises storing the object in the memory based on the object having been requested the designated number of times.

43. A method of controlling admission of objects into a web cache, comprising:
  receiving a request for an object not in the cache, the object being identifiable by a Universal Resource Locator (URL);
  determining if the object has previously been requested;
  caching the object if it has previously been requested;
  updating, if the object has not been previously requested, a first data record to indicate that the object has been requested;
  comparing the size of the object to the average size of objects currently cached;
  caching the object if its size is less than the average size of objects currently cached;
  evicting, in connection with caching the object, one or more currently cached objects on a Least Recently Used (LRU) basis;
  updating, upon admission of the object into the cache a second data record to indicate presence of the object in the cache; and
  recalculating the average size of currently cached objects based upon the presence of the object in the cache.

44. A method of managing a computer memory by selectively admitting new objects into the memory, comprising:
  (a) receiving requests for objects not stored in the memory;
  (b) evaluating each of the objects according to a first criterion, wherein the first criterion is based solely on the number of previous requests for the object;
  (c) as to each of the objects satisfying the first criterion in step (b), storing the object in the memory based on satisfaction of the first criterion;
  (d) as to each of the objects not satisfying the first criterion in step (b), evaluating the object according to a second criterion, wherein the second criterion is based solely on size of the object in comparison to another size value;
  (e) as to each of the objects satisfying the second criterion in step (d), storing the object in the memory based on satisfaction of the second criterion;
  (f) as to each of the objects not satisfying the second criterion in step (d), not storing the object in the memory until a subsequent request for the object; and
  (g) evicting one or more previously stored objects in connection with storing one of the objects that satisfies the second criterion and does not satisfy the first criterion.

* * * * *

UNITED STATES PATENT AND TRADEMARK OFFICE
CERTIFICATE OF CORRECTION

PATENT NO. : 7,051,161 B2 Page 1 of 1
APPLICATION NO. : 10/244449
DATED : May 23, 2006
INVENTOR(S) : Sudhir Dixit et al.

It is certified that error appears in the above-identified patent and that said Letters Patent is hereby corrected as shown below:

On Title Page, Item (75)

The spelling of the second inventor's name is corrected to be --Tao Wu-- instead of "Tau Wu".

Column 9,

Line 2, "objcct" is replaced with --object--.

Signed and Sealed this

Twenty-eighth Day of November, 2006

JON W. DUDAS
*Director of the United States Patent and Trademark Office*